United States Patent [19]

Haines et al.

[11] 4,306,719
[45] Dec. 22, 1981

[54] CORES FOR TENNIS BALLS

[75] Inventors: Robert C. Haines, Huddersfield; John G. Schofield, Barnsley, both of England

[73] Assignee: Dunlop Limited, England

[21] Appl. No.: 94,828

[22] Filed: Nov. 16, 1979

[30] Foreign Application Priority Data

Jan. 12, 1979 [GB] United Kingdom ............... 7901306

[51] Int. Cl.³ .............................................. A63B 39/00
[52] U.S. Cl. ......................... 273/61 C; 273/DIG. 10; 260/3; 260/4 R; 260/998.14; 525/211
[58] Field of Search ......................... 260/3, 4, 998.14; 525/211; 273/61 C, DIG. 10

[56] References Cited

U.S. PATENT DOCUMENTS

| | | | |
|---|---|---|---|
| 4,008,190 | 2/1977 | Taylor et al. | 260/5 |
| 4,031,169 | 6/1977 | Morris | 525/211 |
| 4,036,912 | 7/1977 | Stricharczuk | 525/211 |
| 4,089,820 | 5/1978 | Wright | 260/5 |
| 4,145,045 | 3/1979 | Pocklington | 260/5 |

FOREIGN PATENT DOCUMENTS

| | | | |
|---|---|---|---|
| 766651 | 9/1967 | Canada | 273/61 C |
| 766997 | 9/1967 | Canada | 273/61 C |
| 1131321 | 10/1968 | United Kingdom | |
| 1177224 | 1/1970 | United Kingdom | |
| 1520254 | 8/1978 | United Kingdom | |

*Primary Examiner*—Allan Lieberman
*Attorney, Agent, or Firm*—Stevens, Davis, Miller & Mosher

[57] ABSTRACT

A core for a tennis-ball, the tennis-ball having either an internal pressure substantially equal to atmospheric pressure (a "pressureless" ball) or an internal pressure of up to 7 p.s.i. (0.49 Kg.cm$^{-2}$) above atmospheric pressure (a "low-pressure" ball), in which the core is made from a rubber composition wherein up to 60% by weight of the total polymer content comprises either a copolymer of ethylene and propylene (an EPM elastomer) or a terpolymer of ethylene, propylene and up to 12% by weight of a non-conjugated diene monomer (an EPDM elastomer). The most suitable EPM and EPDM elastomers are those containing 70 mole percent or more ethylene.

4 Claims, No Drawings

CORES FOR TENNIS BALLS

This invention relates to cores for tennis-balls, with particular reference to tennis-balls of increased life.

Two types of tennis-balls are currently commercially available:

(a) Pressurised balls, which are made with a core of natural or synthetic rubber and pressurised to 10–12 p.s.i. (0.7 to 0.84 Kg/cm$^2$) above atmospheric pressure by means of air and/or a gas;

(b) Non-pressurised balls, which are made with a core of natural or synthetic rubber and contain air at atmospheric pressure.

Pressurised balls lose their pressure over a few months, owing to permeation of the inflation gas through the wall of the core. Consequently, the properties of such balls change as the pressure decreases until they become unsatisfactory for use as tennis-balls. While it is known to store such balls in a pressurised container prior to use, this method is expensive and inconvenient. Moreover, once the balls have been removed from the containers, they will once again be subject to loss of pressure.

Many attempts have been made to provide satisfactory non-pressurised (hereinafter called "pressureless") balls which do not suffer from this disadvantage, but few of the currently-available pressureless balls are acceptable to high-class tennis players. In fact, it has been estimated that less than 5% of the total world demand for tennis-balls is for the pressureless type of ball.

The fundamental problem of producing a satisfactory pressureless tennis-ball is that of satisfying the criteria of rebound, compression and weight laid down by the International Tennis Federation and at the same time providing satisfactory playing qualities. These criteria can only be satisfied by the use of rubber core compositions which have high resilience, high modulus of elasticity and low density.

It has been found hitherto that, using current technology, rubber core compositions which satisfy the criteria of rebound and weight invariably have a relatively high "Forward Compression", i.e. the balls are very hard. Such balls produce an unsatisfactory "feel" on impact with a racket and it is this factor which makes the currently-available pressureless balls generally unacceptable to good tennis-players.

In further considering the problems of extending the life of tennis-balls, the storage and playing life of a pressurised tennis-ball would be significantly increased if satisfactory balls could be made when the cores are inflated to a substantially lower pressure than usual. The rate at which a gas permeates through a material is proportional to the difference in pressure on either side of the material. Thus, a lower internal pressure will result in a lower rate of permeation of gas through the wall of a pressurised ball.

It will be appreciated that a tennis-ball, inflated to a lower than normal pressure, can readily be made by inflating a pressureless core in which the rebound and compression of the core wall have been slightly reduced by modifications of the rubber composition. The low inflation pressure then restores the rebound and compression to the appropriate level. One of the problems encountered in inflating a pressureless core in this way is that such cores are often made from highly-resilient polybutadiene rubbers, which exhibit high permeability to gases. Such cores would therefore lose even their low degree of pressurisation at a high rate and would, in fact, have a storage life which is inferior to that of the currently-available pressurised balls.

We have found that satisfactory balls, both of the pressureless and low-pressure type, can be provided if the cores are made from rubber compositions in which up to 60% by weight of the total polymer content comprises an ethylene/propylene/diene monomer (EPDM elastomer) or an ethylene/propylene monomer (EPM elastomer).

Accordingly, the present invention provides a core for use in the manufacture of a tennis-ball, the tennis-ball having either an internal pressure substantially equal to atmospheric pressure (a "pressureless" ball) or an internal pressure of up to 7 p.s.i. (0.49 Kg/cm$^2$) above atmospheric pressure (hereinafter called a "low-pressure" ball), the core being made from a rubber composition in which up to 60% by weight of the total polymer content is an EPM elastomer or an EPDM elastomer (both as hereinafter defined).

By "EPM elastomer" is meant a copolymer of ethylene and propylene. By "EPDM elastomer" is meant a terpolymer of ethylene, propylene and up to 12% by weight of a non-conjugated diene monomer.

The non-conjugated diene monomer which is present in the EPDM elastomer introduces unsaturated carbon-carbon bonds and provides sites for sulphur vulcanisation. Typical dienes which may be used include 1,4-hexadiene, ethylidene norbornene and di-cyclopentadiene.

We have found that the most suitable EPM and EPDM elastomers are those which contain 70 mole % or more ethylene. Particularly suitable EPDM elastomers are those which contain ethylidene norbornene as the non-conjugated diene.

In a particularly preferred embodiment, the present invention provides a core for use in the manufacture of a pressureless or low-pressure tennis-ball, the core being made from a rubber composition in which up to 60% by weight of the total polymer content is an EPM or EPDM elastomer (as hereinbefore defined), the said elastomer having moreover the following properties in gum (i.e. uncompounded and unvulcanised) form:

(i) an ethylene content of at least 70 mole %
(ii) a tripsometer resilience of at least 55% at 21° C.;
(iii) a Shore A Hardness of at least 55;
(iv) a Mooney viscosity (ML 1+4 at 100° C.) of at least 60, preferably at least 80.

Although it is not intended that the present invention be construed with reference to any particular theory, it is believed that EPM and EPDM elastomers of high ethylene content are particularly suitable because of their propensity to crystallise, which imparts high modulus of elasticity, together with high resilience, to the rubber composition.

Another advantage of EPM and EPDM elastomers is their relatively low specific gravity (around 0.87). By comparison, the conventionally-used natural rubber, polybutadiene and styrene-butadiene resins have, respectively, specific gravities of 0.92, 0.92 and 1.04. The lower specific gravity of EPM and EPDM elastomers allows thicker core-walls to be made without exceeding the specified weight limits. In turn, this results in better rebound and compression properties and, in the case of a low-pressure ball, a reduced gas-permeability.

In the case of a pressureless ball composition, the EPM or EPDM elastomer is compounded with a high proportion of polybutadiene, which adds to the resilience of the composition.

In the case of a low-pressure ball, the EPM or EPDM elastomer is compounded with natural rubber, which imparts adequate resilience. EPM and EPDM elastomers have gas-permeability characteristics which are superior to those of polybutadiene and are similar to those of natural rubber. Thus, the elastomers are suitable for use when gas-retention is important.

The EPM and EPDM elastomers may also be compounded with crystalline poly-alpha-olefins, e.g. high-density polyethylene and polypropylene.

Another significant advantage of EPM and EPDM elastomers is their admirable long-term ageing characteristics. Ball cores having a high content of EPM and EPDM elastomer will therefore retain their highly elastic properties for several years and this is of significance when such cores are used in the manufacture of pressureless balls.

It is perhaps surprising that EPM and EPDM elastomers can be used to make resilient compounds suitable for the core of a tennis ball since they are more usually employed in applications which utilise their ability to accept high loadings of cheap fillers, for producing relatively inexpensive compositions for use in footwear, flooring, sealing strips and the like.

The present invention will be illustrated, merely by way of example, in the following description.

The elastomers whose properties are given in TABLE A (below) were used as the basic EPM and EPDM polymers in the manufacture of tennis-ball cores. The details given are for the elastomers in gum form (i.e. uncompounded and unvulcanised).

TABLE A

| Notes (v.i.) | Elastomer | Mooney Viscosity (ML 1 + 4, 100° C.) | Mole % ethylene | Unsaturation % W/W | Diene type | Resilience* %, 21° C. | Hardness (Shore A) |
|---|---|---|---|---|---|---|---|
| (a) | I(EPDM) | 69 | 80 | 3.6 | 1,4-hexadiene | 60 | 78 |
| (b) | II(EPDM) | 87 | 70 | 5.4 | Ethylidene norbornene | 59 | 59 |
| (c) | III(EPM) | 83 | 70 | — | | 59 | 70 |
| (d) | IV(EPDM) | 78 | 76 | 6.2 | Ethylidene norbornene | 68 | 67 |

Notes - TABLE A
*DUNLOP TRIPSOMETER RESILIENCE
(a) Available from E I Du Pont de Nemours, Inc., as NORDEL 1560
(b) Available from Montedison as DUTRAL TER 038E
(c) Available from Montedison as DUTRAL CO 038
(d) Available from I S R Co Ltd as INTOLAN 255
The words NORDEL, DUTRAL and INTOLAN are Registered Trade Marks.

A formulation for pressureless tennis-ball cores was made up, as shown in Table B (below):

TABLE B

| Notes (v.i.) | Ingredient | parts by weight |
|---|---|---|
| (f) | EPM or EPDM Elastomer | 40 |
| (g) | Polybutadiene | 50 |
| (h) | Natural Rubber | 10 |
| | Zinc Oxide | 7 |
| | Stearic Acid | 1 |
| (i) | Antioxidant | 1 |
| | Wood flour | 12.5 |
| (j) | Carbon Black | 10 |
| | Di-benzthiazyl disulphide | 2 |
| | Diphenylguanidine | 1 |
| | Sulphur | 3.5 |

Notes - TABLE B
(f) Elastomer I, II, III or IV (See Table A - above)
(g) Available from Japan Synthetic Rubber Co. as JSR BRO 1
(h) Standard Malaysian Rubber 5CV 60
(i) Available from Vulnax Ltd., as PERMANEX WSO
(j) Intermediate Super Abrasion Furnace (ISAF) Black
The word PERMANEX is a Registered Trade Mark.

Tennis-ball half-shells, made by forming compounds derived from TABLE B formulations in a suitable mould and curing for 2½ minutes at 160° C., were joined together to form cores and the cores cured for 3 minutes at 170° C., followed by cooling.

Cores made from Elastomers III and IV (see TABLE A—above) were made into tennis-balls by covering with a conventional tennis ball cloth and tested for rebound and for forward and return compression according to the procedure specified by the International Tennis Federation.

The results of these tests are given in TABLE C (below:

TABLE C

| Property | | Elastomer (see TABLE A) III | IV | I.T.F.* Specification |
|---|---|---|---|---|
| Rebound at 20° C. | ins | 56 | 56 | 53–58 |
| | cm | 140 | 140 | 132.5–145 |
| Forward compression at 20° C. | ins | 0.232 | 0.245 | 0.220–0.290 |
| | cm | 0.58 | 0.6125 | 0.55–0.725 |
| Return compression at 20° C. | ins | 0.382 | 0.381 | 0.335–0.425 |
| | cm | 0.955 | 0.9525 | 0.8875–1.0625 |

*International Tennis Federation.

A low-pressure core (internal pressure 7 p.s.i. (0.49 Kg/cm$^2$) above atmospheric) was made from the formulation shown in TABLE D (below):

TABLE D

| Notes (v.i.) | Ingredient | Parts by Weight |
|---|---|---|
| (l) | EPDM Elastomer | 30.0 |

TABLE D-continued

| Notes (v.i.) | Ingredient | Parts by Weight |
|---|---|---|
| | Natural Rubber | 70.0 |
| | Zinc Oxide | 7.0 |
| | Stearic Acid | 1.0 |
| | Magnesium Carbonate | 20.0 |
| | Woodflour | 12.0 |
| (m) | Antioxidant | 1.0 |
| | Di-phenyl guanidine | 1.5 |
| (n) | CBS | 2.0 |
| | Sulphur | 3.5 |

Notes to TABLE D
(l) Available from I S R Co Ltd as INTOLAN 255
(m) Available from Vulnax as PERMANEX WSO
(n) N-Cyclohexyl-2-benzothiazyl sulphenamide Tennis balls were made by moulding and vulcanising the formulations to form cores and covering the cores with tennis cloth in a conventional manner.

Balls whose cores had the formulations shown in TABLES B and D (above) were tested for rebound, weight, and forward and return compression, in comparison with known pressureless and pressurised balls. The results of these tests are given in TABLE E (below).

TABLE E

| Property | | Pressureless Ball (X) | Low Pressure Ball (Y) | Known Pressureless Ball | Known Pressurised Ball | I.T.F.* Specification |
|---|---|---|---|---|---|---|
| Rebound | | | | | | |
| | ins | 55 | 55 | 53 | 55 | 53–58 |
| | cm | 137.5 | 137.5 | 132.5 | 137.5 | 132.5–145 |
| Weight (g) | | 57.5–58.0 | 57.0–58.0 | 57.0–58.0 | 57.0–58.0 | 56.7–58.5 |
| Forward Compression | | | | | | |
| | ins | .250–.270 | .260–.270 | .210–.230 | .245–.290 | .220–.290 |
| | cm | 0.625–0.675 | 0.65–0.675 | 0.525–0.575 | 0.6125–0.725 | 0.55–0.725 |
| Return Compression | | | | | | |
| | ins | .390–.410 | .375–.385 | .345–.380 | .350–.370 | .350–.425 |
| | cm | 0.975–1.025 | 0.9375–0.9625 | 0.8625–0.95 | 0.875–0.925 | 0.875–1.0625 |

(X) See TABLE B (above)
(Y) See TABLE D (above)
*International Tennis Federation It will be seen that the pressureless and low-pressure balls of the invention conform exactly to the requirements of the International Tennis Federation.

These balls were subjected to playing tests by good amateur and professional tennis-players. The pressureless balls were found to play much more like conventional pressurised balls than the currently-available pressureless balls and the low-pressure balls were also found to have highly satisfactory playing properties.

Moreover, tests carried out on the low-pressure balls over a period of 4 months showed that they retained their compression and rebound properties unchanged, whereas under the same conditions, a conventional pressurised ball lost 3 inches (7.5 cm) in rebound and 0.020 inches (0.05 cm) in forward compression.

Having now described our invention what we claim is:

1. A core for a tennis ball, said tennis ball having either an internal pressure substantially equal to atmospheric pressure (a "pressureless" ball) or an internal pressure of up to 7 psi (0.49 kg.cm$^{-2}$) over atmospheric pressure (a "low pressure" ball), said core being made from a composition based upon (1) a polymer selected from the group consisting of natural rubber and synthetic rubbers and (2) an effective amount of up to 60% by weight of said polymer of either an elastomeric copolymer of ethylene and propylene (EPM elastomer) or an elastomeric terpolymer of ethylene, propylene, and up to 12% by weight of said terpolymer of a non-conjugated diene monomer (EPDM elastomer), said EPM or EPDM elastomer having, in gum form, an ethylene content of at least 70 mole percent, a Tripsometer Resilience of at least 55% (21° C.), a Shore A Hardness of at least 55, and a Mooney Viscosity (ML 1+4 at 100° C.) of at least 60, said EPM or EPDM elastomer being present in an amount sufficient to improve the rebound and compression properties of a tennis ball as compared to a tennis ball that does not contain an effective amount of said EPM or EPDM elastomer in its core.

2. A tennis ball having a core and a cover therefor, said core being made from a rubber composition based upon (1) a polymer selected from the group consisting of natural rubber and synthetic rubbers and (2) an effective amount of up to 60% by weight of said polymer of either an elastomeric copolymer of ethylene and propylene (EPM elastomer) or an elastomeric terpolymer of ethylene, propylene, and up to 12% by weight of a non-conjugated diene monomer (EPDM elastomer), said EPM or EPDM elastomer having, in gum form, an ethylene content of at least 70 mole percent, a Tripsometer Resilience of at least 55% (21° C.), a Shore A Hardness of at least 55, and a Mooney Viscosity (ML 1+4 at 100° C.) of at least 60, said EPM or EPDM elastomer being present in an amount sufficient to improve the rebound and compression properties of a tennis ball as compared to a tennis ball that does not contain an effective amount of said EPM or EPDM elastomer in its core.

3. The core of claim 1, in which the said elastomer is an EPDM elastomer wherein the non-conjugated diene monomer is a monomer selected from the group consisting of 1,4-hexadiene, ethylidene norbornene, and dicyclo pentadiene.

4. The core of claim 1, in which the said elastomer has a Mooney Viscosity (ML 1+4 at 100° C.) of at least 80.

* * * * *